United States Patent
Bozak et al.

(10) Patent No.: US 7,882,210 B2
(45) Date of Patent: Feb. 1, 2011

(54) DYNAMIC AGENT FORMATION FOR EFFICIENT DATA PROVISIONING

(75) Inventors: Erol Bozak, St. Leon-Rot (DE); Alexander Gebhart, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 805 days.

(21) Appl. No.: 11/833,153

(22) Filed: Aug. 2, 2007

(65) Prior Publication Data
US 2009/0037571 A1    Feb. 5, 2009

(51) Int. Cl.
G06F 15/173 (2006.01)
G06F 15/16 (2006.01)
G06F 3/00 (2006.01)

(52) U.S. Cl. .................. 709/223; 709/202; 719/317
(58) Field of Classification Search .................. None
See application file for complete search history.

(56) References Cited

U.S. PATENT DOCUMENTS

| 6,349,325 B1 * | 2/2002 | Newcombe et al. ......... 709/202 |
| 6,851,115 B1 * | 2/2005 | Cheyer et al. .............. 719/317 |
| 6,990,670 B1 * | 1/2006 | Hodjat ....................... 719/317 |
| 7,624,167 B1 * | 11/2009 | Benjamin ................... 709/223 |
| 2002/0019864 A1 * | 2/2002 | Mayer ........................ 709/223 |

* cited by examiner

Primary Examiner—Wen-Tai Lin
(74) Attorney, Agent, or Firm—Mintz, Levin, Cohn, Ferris, Glovsky & Popeo, P.C.

(57) ABSTRACT

Methods and apparatus, including computer program products, are provided for monitoring one or more computers in a distributed computing system. In one aspect, there is provided a computer-implemented method. The method may include determining, at a node, a first quantity of first agents reporting to the node and limiting the quantity of first agents to not exceed a predetermined threshold. The first agents configured to directly report to the node a first information corresponding to systems being monitored by the first agents. A second quantity of second agents may also be determined. The second agents report to the node through the first agents. The second agents report a second information corresponding to systems being monitored by the second agents. The first agents may be notified to report to the node the first information corresponding to systems being monitored by the first agents. The second agents may be notified to report to at least one of the first agents the second information corresponding to systems being monitored by the second agents. Related apparatus, systems, methods, and articles are also described.

20 Claims, 4 Drawing Sheets

DYNAMIC AGENT FORMATION FOR EFFICIENT DATA PROVISIONING

FIELD

The present disclosure generally relates to distributed computing. More particularly, the present disclosure relates to implementing agents that provide monitoring data in a distributed computing environment.

BACKGROUND

Computers have now become an integral part of our society both in business and in residential settings. Almost every business of sufficient size in Germany, the United States, and other developed countries have one or more computers to assist them in running their businesses. Similarly, many families in those countries now have computers at home that are used to run various applications including games.

Some attribute the popularity of the computers to the Internet. The Internet provides people with a ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of computer nodes that work together to perform a function, so that in many respects the cluster can be viewed as a single computer. The nodes of a cluster are usually coupled by a network, such as the Internet or an intranet. The cluster may be managed either statically (i.e., static cluster management) or dynamically (i.e., dynamic cluster management).

A static cluster is a group of application servers that participate in some form of workload management. With a static cluster, the application servers that are in a cluster are static, and once defined, all the application servers in the cluster are usually started or stopped all at once. In short, the application servers are statically assigned to a specific cluster of nodes.

In contrast, dynamic clusters are controlled by autonomic controllers (or managers) that optimize the performance of the cluster. Moreover, a dynamic cluster can start and stop individual instances of application servers as required. A dynamic cluster may also dynamically balance the workloads of the nodes of the cluster based on performance information collected from cluster nodes. Consequently, dynamic clusters optimize the use of the processing capabilities of the nodes (i.e., computers) in the clusters. When compared to a single computer or even a static cluster, the dynamic cluster may provide increased performance and overall lower total cost of ownership by better utilizing the existing processing capabilities of the cluster.

Whatever the type of distributed computing system being used, distributed computing systems require monitoring systems to monitor nodes in the system. To that end, there continues to be a need to develop mechanisms to monitor distributed computing systems.

SUMMARY

The subject matter disclosed herein provides methods and apparatus, including computer program products, for monitoring computers of a distributed computing system.

In one aspect, there is provided a computer-implemented method for monitoring one or more computers in a distributed computing system. In one aspect, there is provided a computer-implemented method. The method may include determining, at a node, a first quantity of first agents reporting to the node and limiting the quantity of first agents to not exceed a predetermined threshold. The first agents configured to directly report to the node a first information corresponding to systems being monitored by the first agents. A second quantity of second agents may also be determined. The second agents report to the node through the first agents. The second agents report a second information corresponding to systems being monitored by the second agents. The first agents may be notified to report to the node the first information corresponding to systems being monitored by the first agents. The second agents may be notified to report to at least one of the first agents the second information corresponding to systems being monitored by the second agents.

Variations may include one or more of the following features. The node may be implemented as a system manager of a distributed computing system. A first agent may report the first information by sending a first message to the node. The first information may include performance information at the system being monitored. A second agent may report second information by sending a second message to at least one of the first agents. Another predetermined threshold for another agent may be determined based on capabilities of the other agent. The predetermined threshold may be adaptively determined based on the processing capabilities at any given time at the system being monitored.

The subject matter described herein may be implemented to realize the advantage of a monitoring system that can scale to monitor small as well as very large distributed computing systems.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

In the drawings.

Like labels are used to refer to same or similar items in the drawings.

DETAILED DESCRIPTION

Figure 1:
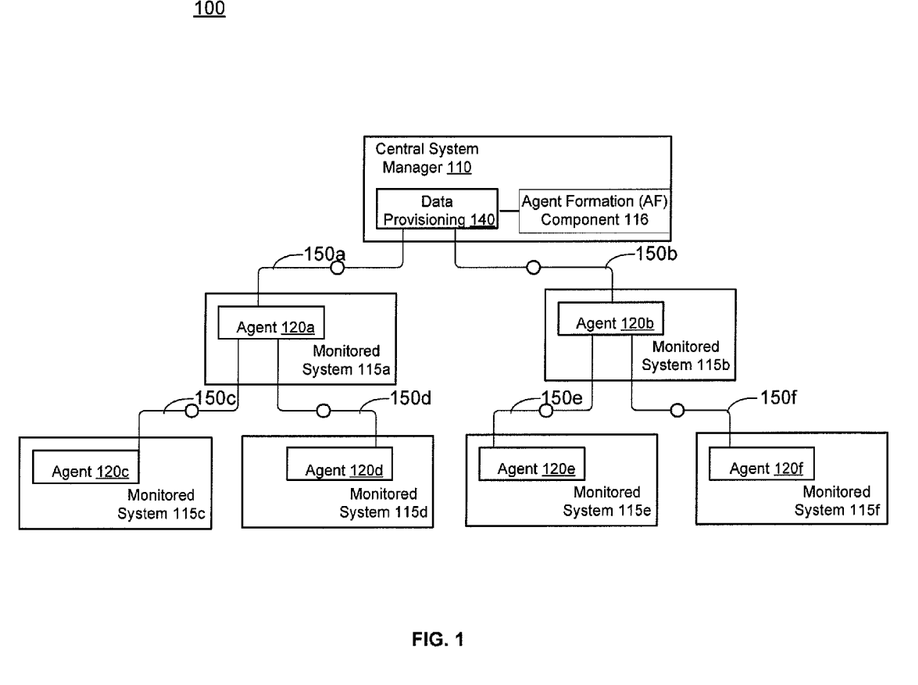
FIG. 1 depicts a block diagram of agents dynamically deployed to monitor a distributed computing system.

FIG. 1 depicts a distributed computing system 100 including monitored systems 115a-f coupled to central system manager 110 through communication links 150a-f (e.g., the Internet). The monitored systems 115a-f include agents 120a-f. The central manager 110 and agents 120a-f deployed in the systems being monitored form a distributed monitoring system to enable central system manager 110 to manage the distributed computing system 100. The agents 120a-f monitor their respective systems, collect data, and report monitoring data to the central manager system 110. The provided information may be stored as provisioning information 140. Central system manager 110 uses provisioning information 140 provided by agents 120a-f to manage the distributed computing system 100.

The agents 120a-f of FIG. 1 have been dynamically deployed in a structure to minimize traffic between central system manager 110, agents 120a-f, and monitored systems 115a-f. The dynamic deployment of the agents of FIG. 1 is implemented using agent formation component 116.

The agent formation component 116 forms the monitoring structure (also referred to as a hierarchy) of FIG. 1 to limit the number of directly reporting agents to the central system manager 110 and to limit the number agents directly reporting to other agents as well. Moreover, when an agent requests to join distributed computing system 100, agent formation component 116 may process the request to ensure that the number of directly reporting agents does not exceed a predetermined threshold. For example, in the example of FIG. 1, if the predetermined threshold is two, an agent requesting to join distributed computing system 100 would be denied by agent formation component 116 entry at central system manager 110 where agents 120a and 120b directly report to central system manager 110. The new, requesting agent would also be denied entry by agents 120a-b where each has two directly reporting agents. However, the new, requesting agent (in this example) would be allowed to directly report (and thus connect) to any of agents 120c-f since a connection to any of agents 120c-f would not exceed the predetermined threshold of 2. Although the previous example used a threshold of 2, the predetermined threshold may be any other quantity or type of value (e.g., instead of a quantity threshold representation of connections or agents, a performance threshold based on the performance of the agents). Moreover, although in the previous example each agent used the same predetermined threshold, in some implementations, the agents may have the same or different predetermined thresholds.

In some implementations, the agent formation component 116 implements the process 200 of FIG. 3 (described further below) to limit the number of directly reporting agents to the central system manager 110 and to limit the number agents directly reporting to other agents. Moreover, the assignment (e.g., selection) of the directly reporting agents as well as the assignment of other agents may take into account the performance of the agents, as described further below.

Figure 2:
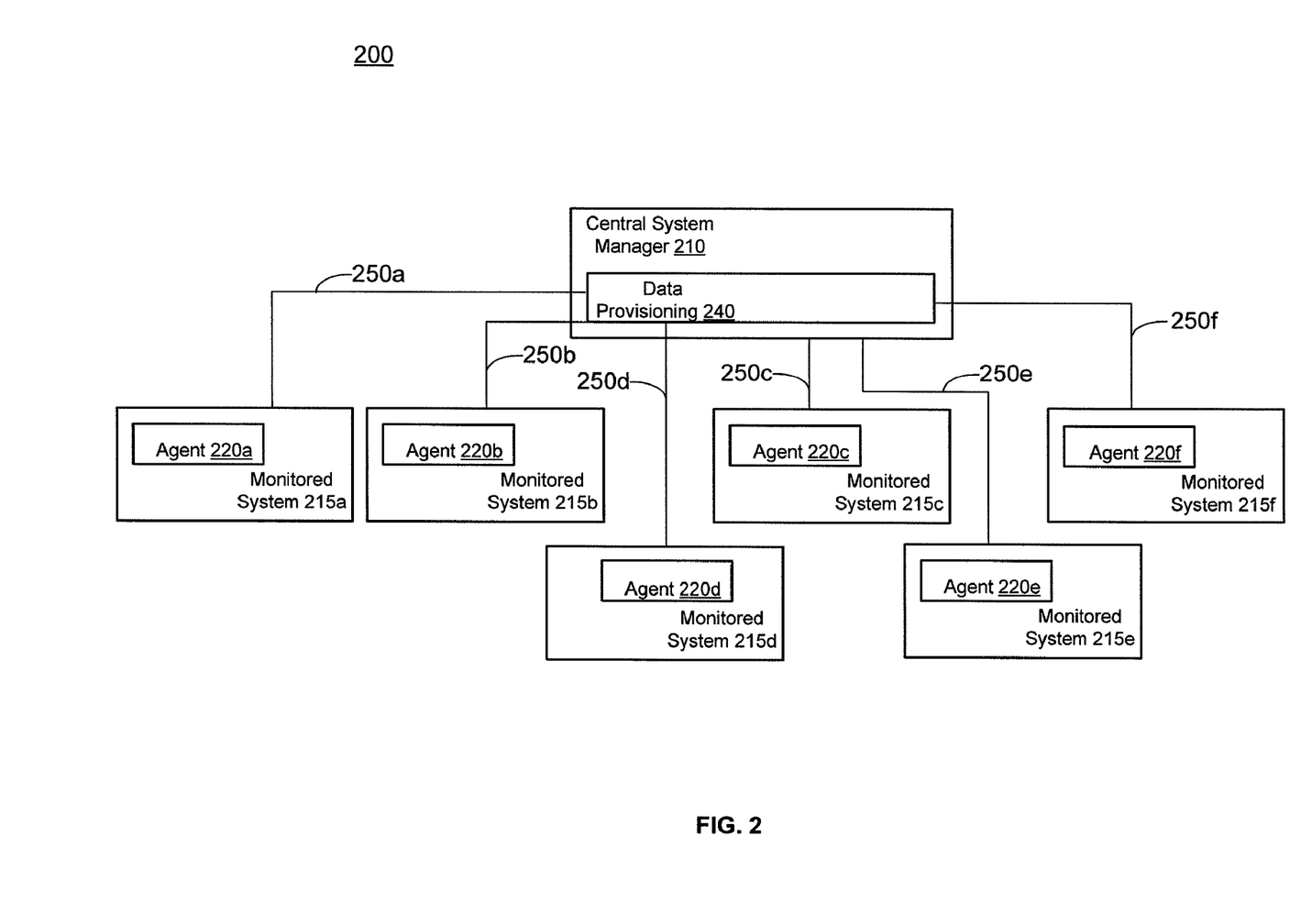
FIG. 2 depicts a block diagram of agents without the dynamic deployment depicted in FIG. 1.

FIG. 2 depicts a distributed computing system not utilizing an agent formation component 116 to limit the number of directly reporting agents to the central system manager 210 as well as to other agents. The distributed monitoring system 100 may include a central manager 210 coupled through communication links 250a-f to agents 220a-f deployed in the systems 215a-f being monitored. Like agents 120a-f, the agents 220a-f act as data collectors and report monitoring data of a monitored system to the central manager system 210. However, agents 220a-f have not be deployed using agent formation component 116 as depicted in FIG. 1. As a consequence, FIG. 2 depicts a flat monitoring structure of agents 220a-f and central manager 210. The flat reporting structure allows every agent to directly connect to and communicate with central manager system 210. In distributed systems where the number of monitored systems includes thousands if not millions of monitored systems, the flat reporting structure depicted in FIG. 2 may not practical since central manager system 210 would maintain connections to all of the agents. If the hierarchy of FIG. 2 is implemented in an environment including thousands if not millions of systems being monitored and corresponding agents, central system manager 210 may be inundated with connections-resulting in burdensome processing at central system manager 210 as well as delays in processing monitoring information from agents 220a-f.

Figure 3:
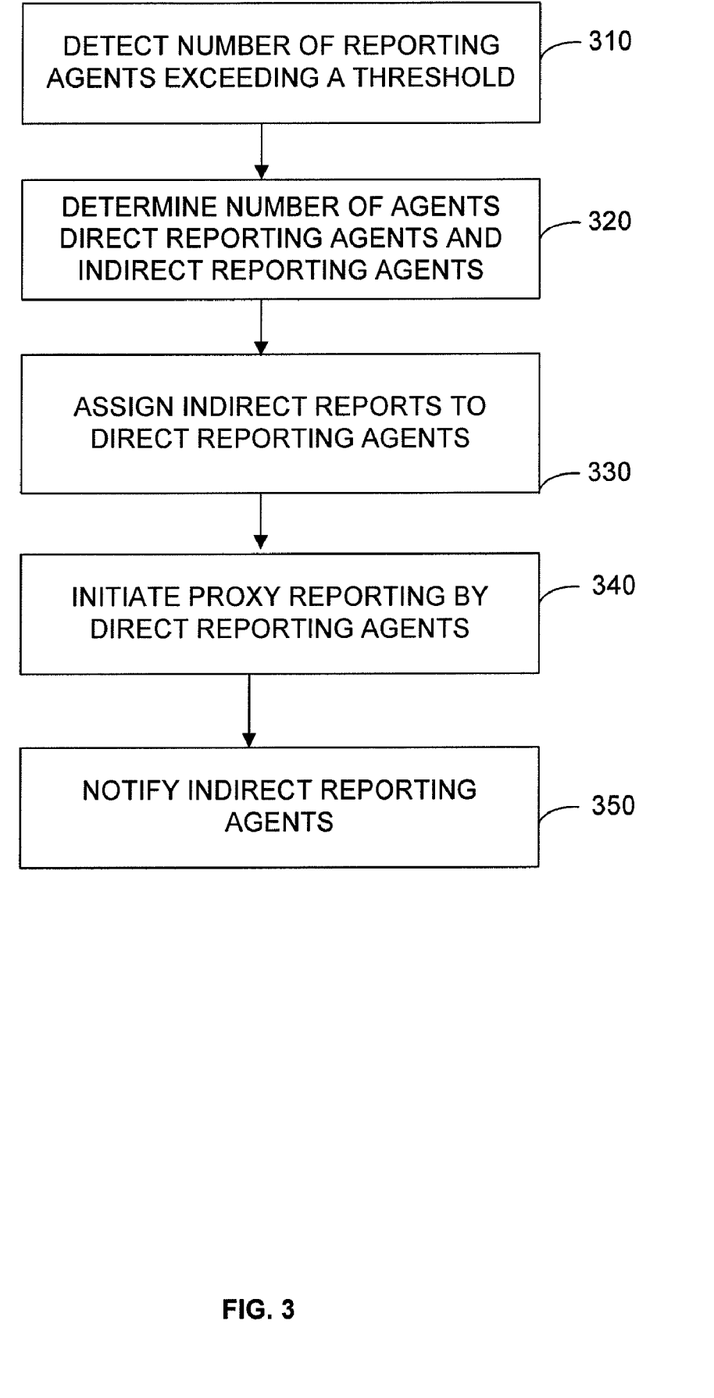
FIG. 3 depicts a process of dynamically deploying agents in a distributed computing system.

FIG. 3 depicts a process for forming a hierarchy of agents that limits the number of directly reporting agents to the central system manager 110 and limits the number agents directly reporting to any one agent.

At 310, central system manager 110 including agent formation component 116 detects the number of agents reporting to central system manager 110. In the example of FIG. 2, agent formation component 116 detects 6 agents reporting to central system manager. To detect the number of agents, agent formation component 116 may send a message to all agents to identify themselves, or, alternatively, central system manager 110 may maintain a list of the agents directly reporting to central system manager 110. An agent is considered to directly report to a central system manager when it directly accesses the central system manager by, for example, sending messages and/or opening connections (e.g., an HTTP connection) directly to the central system manager. The detected number of agents is then compared to a predetermined threshold. For example, when the predetermined threshold is set to 2, agent formation component 116 limits to 2 the number of agents that can directly report to central system manager 110, so that only two agents are assigned the role of direct reporting agents, while the remaining number of agents are assigned to the role of indirect reporting agents (i.e., they report to the central system manager 110 indirectly through a proxy such as one of the direct reporting agents).

In some implementations, the predetermined threshold is determined based on the capabilities of the central system manager 110. For example, the more processing capabilities at central system manager 110, the more agents which might be allowed to directly report to the central system manager 110. Moreover, the predetermined threshold may be determined adaptively by determining the processing capabilities at any given time at the system being monitored (which also hosts the agent). For example, when the system being monitored is burdened with a large amount of processing, the predetermined threshold may be decreased, and when the system being monitored is not burdened, the predetermined threshold may be increased.

At 320, agent formation component 116 determines which agents are direct reporting agents and which agents are indirect reporting agents. In the example of FIG. 2, if the predetermined threshold is 2, then 2 agents are assigned to be direct reporting agents, while the remaining agents (in this case 4) are assigned to be indirect reporting agents. In some implementations, agent formation component 116 sends messages to the direct reporting agents to notify them that they are direct reporting agents. The messages to the direct reporting agents may also include the IP address of central system manager 110.

At 330, agent formation component 116 assigns each of the indirect reporting agents to a direct reporting agent. Returning to the previous example, the 4 indirect reporting agents are assigned to one or more of the direct reporting agents 120a-b. In this case, the 4 indirect reporting agents are divided into two groups of two agents, so that agents 120c-d are assigned to direct reporting agent 120a, agents 120e-f are assigned to direct reporting agent 120b. Agents 120c-d thus report to central system manager 110 through agent 120a, while agents 120e-f report to central system manager 110 through agent 120b. The agent formation component 116 may send messages to the indirect reporting agents (e.g., agents 120c-f to notify them that they are indirect reporting agents. The message may include the IP addresses of their proxies, i.e., the addresses of direct reporting agents (e.g., IP address of agents 120a-b) to which they will report monitoring information of systems being monitored. The agent formation component 116 may also send messages to the direct reporting agents (e.g., agents 120a-b) to provide them with the IP addresses of the indirect reporting agents for which they are to proxy monitoring information.

Moreover, in 330, the agent formation component 116 may distribute the indirect reporting agents to the direct reporting agent. In the example of FIG. 2, the number of indirect reporting agents is divided into 2 (since there are 2 direct reporting agents). The selection of the number of indirect reporting agents assigned to another agent (e.g., a direct reporting agent) may be determined based on the capabilities of the agents (e.g., the more processing load a direct agent can handle the larger the quantity of indirect agents assigned to that direct agent). In this context, the manager 210 may maintain for each agent a performance characteristic (e.g., a number representative of performance) used to calculate the quantity of indirect agents to be assigned. For example, supposing there are x agents reporting directly to manager 210, the manager may determine, based on this performance characteristic (or threshold), to build a hierarchy. Moreover, suppose agent A has a performance characteristics of, for example, 1, and the agent B has a performance characteristics of 2 (i.e. agent B can therefore handle twice as many agents as agent A). In this example, the manager 210 may assign twice as many indirect agents to agent B than to agent A.

In one implementation, the assignment of agents may be also be determined based on the performance of the agents. For example, given n agents reporting to a manager 110. The assignment of those n agents and the formation of a hierarchy may be based on the performance of the agents. Specifically, when a tree-like hierarchy is used, the agents having higher performance (e.g., a greater amount of processing speed and/or capability, an amount of memory, an amount of storage capacity, bandwidth to/from network, and the like) would be assigned to a higher level in the hierarchy (e.g., closer to the manager 110) than agents with lower performance. For example, the agents having the highest performance may be assigned directly to manager 110 (e.g., agents 120a and 120b), while lower performing agents (e.g., agents 120c-f may report to those higher performing agents rather than directly to manager 210. Moreover, such a performance-based assignment scheme may be used to assign agents throughout the creation of the hierarchy.

In one implementation, agents may be assigned based on performance using a performance threshold. For example, the assignment of agents may be implemented by determining the number of agents and a corresponding performance threshold Tm. Given n agents (e.g., agents A1, A2, A3 ... An) directly reporting to a manager (e.g., manager 110) with a threshold of Tm, the performance characteristics for each agent may be determined. For example, agent A1 may have a performance characteristics of Apc(1), agent A2 may have a performance characteristic Apc(2), and so forth. Next, if the threshold value Tm exceeds the number of agents n, then a hierarchy is built by having manager 110 sort all the performance characteristics of each agent and assign the first Tm agents having the highest performance characteristics as direct reporting agents (e.g., assuming these direct reporting agents are Adr(1), Adr(2), Adr(3) ... Adr(Tm)). Any remaining agents (e.g., (n−Tm)) may be split proportionally based on the performance characteristics of the direct reporting agents to be assigned. In order to calculate this portion of indirect reporting agents which are assigned to a direct reporting agent, the sum of all performance characteristics of all direct reporting agents (e.g., the first Tm agents) may be determined (e.g., sum Pc=Apc of Adr(1)+Apc of Adr(2)+ ... +Apc of Adr(Tm)). Next, a direct reporting agent Adr(x) may get the remaining portion (e.g., portion for Adr (x)=(n−Tm)*Apc of Adr(x)/Sum Pc). In other words, the number of indirectly reporting agents (n−Tm) may be multiplied by the performance characteristics of the directly reporting agent x (Apc of Adr(x)), the result of which is then divided by the sum of all performance characteristics of all directly reporting agents (Sum Pc).

At 340, agent formation component 116 notifies each directly reporting agent to initiate reporting as well as act as the reporting proxy of any assigned indirect reporting agents. For example, agent formation component 116 may send a message to each of the directly reporting agents 120a and 120b to initiate reporting and to act as the reporting proxy of assigned indirect reporting agents 120c-d and agents 120e-f.

At 350, the agent formation component 116 notifies each indirectly reporting agent to report monitoring information to its assigned direct reporting agent. For example, agent formation component 116 may send a message to each of the indirectly reporting agents 120c-f to begin reporting. The message may also include the destination IP address of such reports (e.g., an assigned direct reporting agent such as agents 120a-b). From the perspective of agent 120a, agents 120c-d directly report to agent 120a, while from the perspective of central system manager 110 agents 120c-d indirectly report through agent 120a. Alternatively, only the direct agents may be notified by a manager to contact their indirect agents regarding reporting. For example, manager 210 may contact only the direct agents and they initiate the re-connection to the manager. In some implementation, certificates may be used to establish trust among the manager and agents. For example, the direct agents may include certificates of the manager to represent that the agents are allowed to act on behalf of the manager.

In some implementations, the monitoring information includes performance information, such as one or more of the following: available bandwidth from the system being monitored to a network, such as communication links 150a-f; available memory; available local persistent storage; read and write speeds to persistent storage; utilization of processors at the system being monitored and applications (e.g., ABAP of Java programs that provide information on "average response times", "throughput", "last accessed time," and the like); middleware components (e.g., caches, JMS queues, EJB containers, Web Services containers, and the like) that provide information on "average queue length", "cache hits", "EJB pool sizes," and the like. Moreover, the systems being monitored may include any computing systems including processors, nodes, clusters, computers, servers, all (or some) of which may be included in a distributed processing system. Moreover, a plurality of agents may be implemented at a single computer to enable monitoring of any type of information.

FIG. 1 is the monitoring hierarchy, which may result from implementing the process of FIG. 3, although other hierarchies are possible as well. In the formation of FIG. 1, the hierarchy has two levels: direct reporting agents (e.g., agents 120*a-b*) and indirectly reporting agents (agents 120*c-f.*

Figure 4:
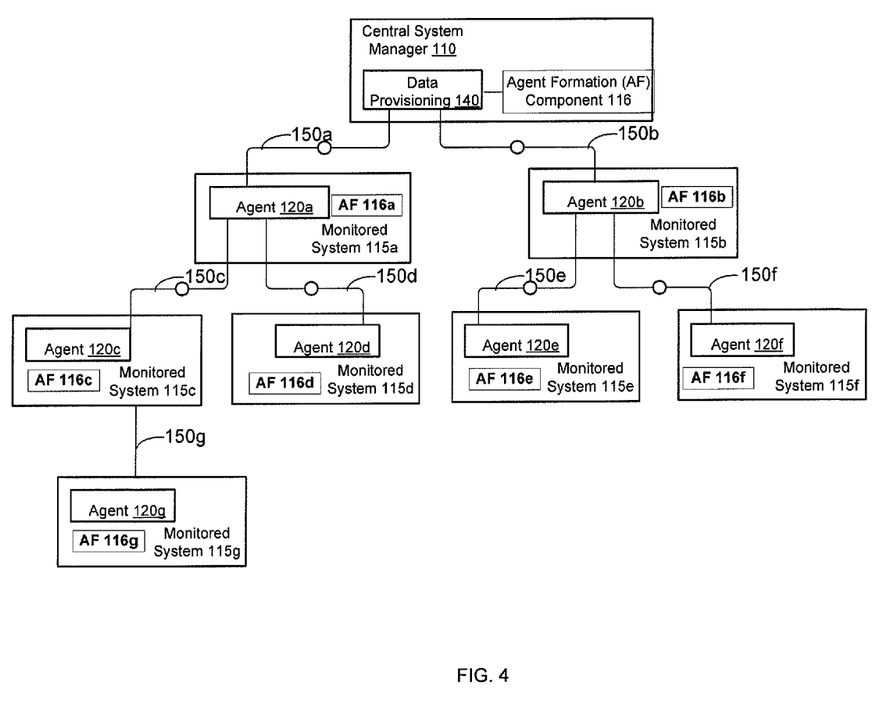
FIG. 4 depicts a block diagram of agent formation components distributed throughout the distributed computing system.

The process described with respect to FIG. 3 may also be used by other agents as well. If an agent detects that the number of reporting agents exceeds a predefined threshold, that agent may initiate the formation of a new hierarchy of reporting agents. For example, if a new, third agent attempts to connect to agent 120*a* and the predetermined threshold is set to 2, the process of FIG. 3 may be performed at agent 120*a* to deny that new, third agent entry. The process of FIG. 3 may result in the new, third agent being assigned as an indirectly reporting agent of agent 120*c*, as depicted in FIG. 4. FIG. 4 also shows that agent formation component 116 may be implemented in one or more of the agents as shown by agents 116*a-g*. Moreover, the agent formation component 116 may be implemented in any agent. The above-described processes may allow manager 210 to initiate the agent hierarchy by assigning a direct agent and indirect agents at the first level of the hierarchy, and all direct agents (including respective agent formation components therein) repeats the agent formation with their respective agents.

In some implementations, agent formation component 116 and agents 116*a-f* operate autonomously using the process of FIG. 3, so that each agent can independently establish its own hierarchy that limits the number of direct reporting agents and assigns indirect reporting agents to report to another agent that acts as a proxy. The process of FIG. 3 may thus be implemented in systems with as few as one or two agents as well as systems with more than a thousand agents.

In some implementations, each agent will maintain the address of a main agent (e.g., central system manager or agent formation component 116). If an agent detects that its proxy (e.g., its direct reporting agent) is not available for any reason, the agent will send a message to the address of the main agent to request a resolution to the non-responsive proxy. For example, if agent 120*b* is not operative or responsive, agent 120*e* may contact agent formation component 116 to request another direct reporting agent so that agent 120*e* can send its monitoring information. Maintaining the address of the manager at the so-called "top" of the agent hierarchy may be used to provide a failover mechanism. If an agent detects that the agent to which it reports monitoring data is not responsive, the agent may contact a manager directly and "ask for resolution." This may result in the manager directing the agent to rejoin the hierarchy as described above. The non-responsive agent may be suspended from accepting accept new agents to act as their proxy.

Referring again to FIG. 1, the central system manager 110 may be implemented as any management system for a distributed system. One example of such a management system is SAP's Adaptive Computing Controller.

The monitored systems 115*a-g* may be implemented as any system capable of being monitored. For example, the monitored systems 115*a-g* may be nodes (e.g., computers, processors, servers, and the like) coupled through links 150*a-g* (e.g., the Internet). The monitored systems 115*a-g* may also be implemented as nodes and clusters in a static cluster management system or a dynamic cluster management system. As noted above, a cluster is a collection of computer nodes (e.g., computers, servers, processors, etc.) that work together.

The agent formation component 116 may also perform one or more of the following functions: detecting the number of agents and whether the detected number of agents equals or exceeds a threshold; determining the number of directly reporting agents; determining the number of indirectly reporting agents; assigning direct reporting agents; assigning indirect reporting agents; initiating reporting by the agents; and notifying agents whether they are direct or indirect reporting agents. In some implementations, agent formation component 116 is part of another program, such as a user interface, central system manager, agent, and/or a monitoring system. The agent formation component 116 may be implemented as a service, such as a Web service or program, at a server or Web site. A service is a software component that is capable of being accessed via standard network protocols, such as Simple Object Access Protocol (SOAP) over Hyper Text Transfer Protocol (HTTP). Although FIG. 1 depicts agent formation component 116 at computer central system manager 110, agent formation component 116 may be located anywhere and in multiple locations, as depicted in FIG. 4.

Communication links 150*a-g* and 250*a-g* may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms. Further, any suitable combination of wired and/or wireless components and systems may provide communication links. Moreover, communication links may be embodied using bi-directional, unidirectional, or dedicated networks.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A computer-implemented method for monitoring a distributed computing system comprising:
    determining, at an agent formation node of the distributed computing system, a first quantity of first agents reporting to the agent formation node and limiting the first quantity of first agents to not exceed a first predetermined threshold, the first agents configured to directly report to the agent formation node a first information corresponding to management of a first portion of the distributed computing system being monitored by the first agents, the agent formation node and the first agents forming a first hierarchy;
    determining a second quantity of second agents reporting to the agent formation node through one of the first agents, the second agents reporting a second information corresponding to management of a second portion of the distributed computing system being monitored by the second agents, wherein when the second quantity of second agents exceeds a second predetermined threshold, dynamically forming a second hierarchy of agents;
    notifying the first agents to report to the agent formation node the first information corresponding to the management of the first portion of the distributed computing system being monitored by the first agents; and
    notifying the second agents to report to the one of first agents the second information corresponding to the management of the second portion of the distributed computing system being monitored by the second agents.

2. The computer-implemented method of claim 1, wherein determining, at the centralized agent formation node, further comprises:
    implementing the centralized agent formation node as a system manager of the distributed computing system.

3. The computer-implemented method of claim 1, wherein determining, at the centralized agent formation node, further comprises:
    reporting the first information by sending a first message to the centralized agent formation node.

4. The computer-implemented method of claim 1, wherein determining, at the centralized agent formation node, further comprises:
    reporting the first information by sending a first message to the centralized agent formation node, the first information including performance information at the first portion of the distributed computing system being monitored.

5. The computer-implemented method of claim 1, wherein determining, at the centralized agent formation node, further comprises:
    reporting the second information by sending a second message to at least one of the first agents.

6. The computer-implemented method of claim 1 further comprising:
    defining another predetermined threshold for another agent, the other predetermined threshold determined based on capabilities of the other agent.

7. The computer-implemented method of claim 1, wherein the first predetermined threshold and the second predetermined threshold are performance values.

8. The computer-implemented method of claim 7 further comprising:
    implementing the first performance value to include at least one of the following: a processing speed, an amount of memory, a storage capacity, and a network bandwidth.

9. The computer-implemented method of claim 7, further comprising:
    assigning other agents to a hierarchy based on a performance value of each of the other agents.

10. The computer-implemented method of claim 1 further comprising:
    using a performance characteristic of an agent and a performance threshold of another agent to determine whether to assign the agent to the other agent.

11. A non-transitory computer-readable medium containing instructions to configure a processor to perform a method, the method comprising:
    determining, at an agent formation node of the distributed computing system, a first quantity of first agents reporting to the agent formation node and limiting the first quantity of first agents to not exceed a first predetermined threshold, the first agents configured to directly report to the agent formation node a first information corresponding to management of a first portion of the distributed computing system being monitored by the first agents, the agent formation node and the first agents forming a first hierarchy;
    determining a second quantity of second agents reporting to the agent formation node through one of the first agents, the second agents reporting a second information corresponding to management of a second portion of the distributed computing system being monitored by the second agents, wherein when the second quantity of second agents exceeds a second predetermined threshold, dynamically forming a second hierarchy of agents;
    notifying the first agents to report to the agent formation node the first information corresponding to the management of the first portion of the distributed computing system being monitored by the first agents; and
    notifying the second agents to report to the one of first agents the second information corresponding to the management of the second portion of the distributed computing system being monitored by the second agents.

12. The non-transitory computer-readable medium of claim 11, wherein determining, at the centralized agent formation node, further comprises:
    implementing the centralized agent formation node as a system manager of the distributed computing system.

13. The non-transitory computer-readable medium of claim 11, wherein determining, at the centralized agent formation node, further comprises:
    reporting the first information by sending a first message to the centralized agent formation node.

14. The non-transitory computer-readable medium of claim 11, wherein determining, at the centralized agent formation node, further comprises:
    reporting the first information by sending a first message to the centralized agent formation node, the first information including performance information at the first portion of the distributed computing system being monitored.

15. The non-transitory computer-readable medium of claim 11, wherein determining, at the centralized agent formation node, further comprises:

reporting the second information by sending a second message to at least one of the first agents.

16. The non-transitory computer-readable medium of claim 11 further comprising:

defining another predetermined threshold for another agent, the other predetermined threshold determined based on capabilities of the other agent.

17. The non-transitory computer-readable medium of claim 11 wherein dynamically forming further comprises defining the first predetermined threshold adaptively based on the processing capabilities at any given time at the system being monitored.

18. A system comprising:

a processor; and a memory, wherein the processor and the memory are configured to perform a method comprising:

determining, at an agent formation node of the distributed computing system, a first quantity of first agents reporting to the agent formation node and limiting the first quantity of first agents to not exceed a first predetermined threshold, the first agents configured to directly report to the agent formation node a first information corresponding to management of a first portion of the distributed computing system being monitored by the first agents, the agent formation node and the first agents forming a first hierarchy;

determining a second quantity of second agents reporting to the agent formation node through one of the first agents, the second agents reporting a second information corresponding to management of a second portion of the distributed computing system being monitored by the second agents, wherein when the second quantity of second agents exceeds a second predetermined threshold, dynamically forming a second hierarchy of agents;

notifying the first agents to report to the agent formation node the first information corresponding to the management of the first portion of the distributed computing system being monitored by the first agents; and notifying the second agents to report to the one of first agents the second information corresponding to the management of the second portion of the distributed computing system being monitored by the second agents.

19. The system of claim 18, wherein determining, at the centralized agent formation node, further comprises:

implementing the centralized agent formation node as a system manager of the distributed computing system.

20. The system of claim 18, wherein determining, at the centralized agent formation node, further comprises:

reporting the first information by sending a first message to the centralized agent formation node.

* * * * *